United States Patent
Snow et al.

(10) Patent No.: US 7,959,189 B2
(45) Date of Patent: Jun. 14, 2011

(54) TUBE INTERFACE AND METHOD OF SECURING A FIRST TUBE TO A SECOND TUBE

(75) Inventors: James D. Snow, Tullahoma, TN (US); Tyler W. McCamey, Murfreesboro, TN (US)

(73) Assignee: Calsonickansei North America, Inc., Farmington Hills, MI (US)

( * ) Notice: Subject to any disclaimer, the term of this patent is extended or adjusted under 35 U.S.C. 154(b) by 500 days.

(21) Appl. No.: 12/109,613

(22) Filed: Apr. 25, 2008

(65) Prior Publication Data

US 2008/0196782 A1 Aug. 21, 2008

Related U.S. Application Data

(62) Division of application No. 11/040,771, filed on Jan. 20, 2005, now Pat. No. 7,380,327.

(51) Int. Cl.
*F16L 41/00* (2006.01)
(52) U.S. Cl. .......................... 285/194; 285/202; 285/320
(58) Field of Classification Search ............... 285/136.1, 285/194, 203, 320, 330, 202
See application file for complete search history.

(56) References Cited

U.S. PATENT DOCUMENTS

| | | | |
|---|---|---|---|
| 978,504 A | 12/1910 | Stewart | |
| 1,141,269 A * | 6/1915 | Rice | 285/136.1 |
| 1,594,220 A * | 7/1926 | Strongson | 285/194 |
| 2,361,704 A | 10/1944 | Patterson | |
| 3,851,846 A | 12/1974 | Long | |
| 4,826,347 A | 5/1989 | Baril et al. | |
| 5,329,997 A | 7/1994 | Bayer et al. | |
| 5,407,004 A | 4/1995 | DeRisi et al. | |
| 5,524,938 A | 6/1996 | Halder | |
| 5,538,076 A * | 7/1996 | Nishida et al. | 285/189 |
| 6,129,394 A | 10/2000 | Bathla | |
| 6,398,269 B1 | 6/2002 | Haussmann | |
| 6,427,769 B2 | 8/2002 | Horie et al. | |
| 6,708,730 B2 | 3/2004 | Chikuma et al. | |
| 7,229,103 B2 * | 6/2007 | Igami | 285/211 |

FOREIGN PATENT DOCUMENTS

| | | |
|---|---|---|
| EP | 1285212 B1 | 9/2003 |
| WO | 9906783 | 2/1999 |

* cited by examiner

*Primary Examiner* — David E Bochna
(74) *Attorney, Agent, or Firm* — Meschkow & Gresham, P.L.C.

(57) ABSTRACT

A tube interface (53) includes a first tube (28) and a second tube (34). The first tube (28) has an oblong opening (54) exhibiting a first major dimension (58), and the second tube (34) has an oblong end (52) exhibiting a second major dimension (72). The oblong end (52) of the second tube (34) is inserted into the oblong opening (54) so that the second major dimension (72) is aligned with the first major dimension (58). The second tube (34) is turned in the oblong opening (54) to move the second major dimension (72) out of alignment with the first major dimension (58) of the oblong opening (54) to secure the second tube (34) to the first tube (28) prior to brazing.

9 Claims, 3 Drawing Sheets

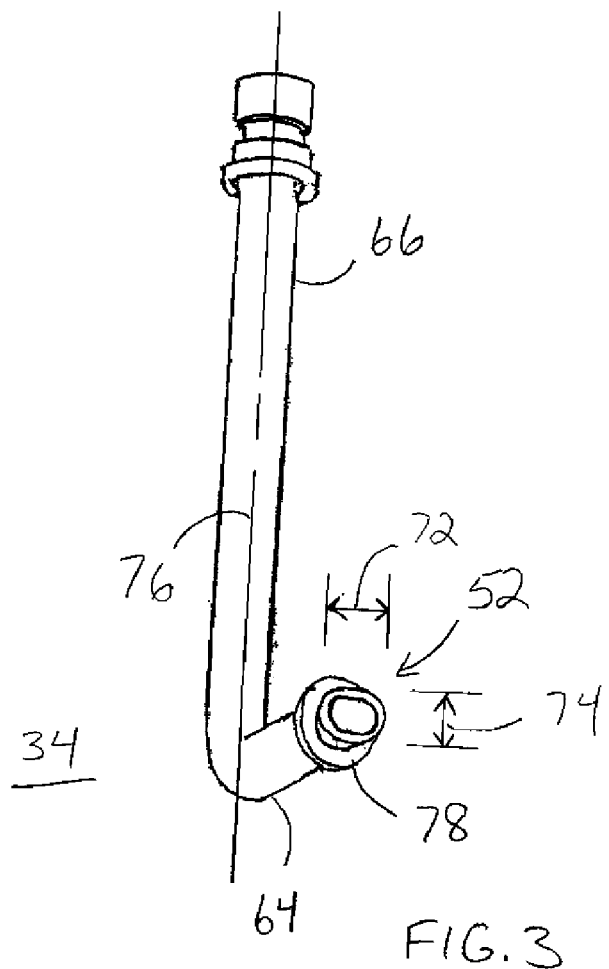
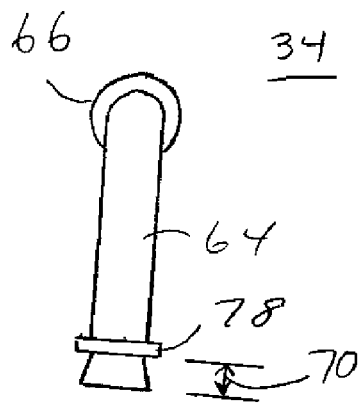
FIG. 3
FIG. 4
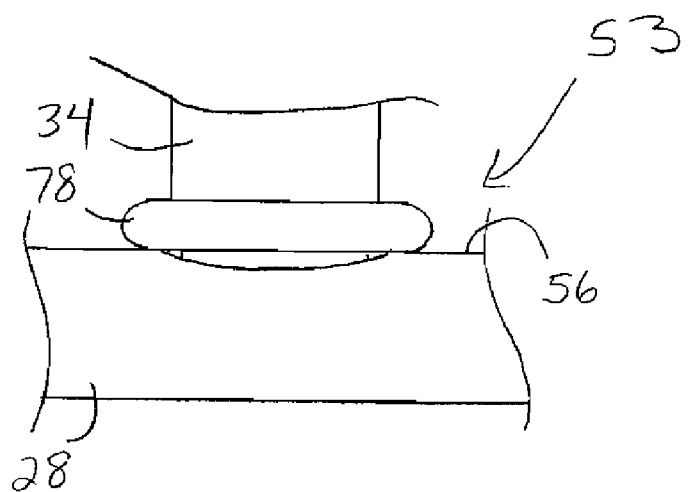
FIG. 7

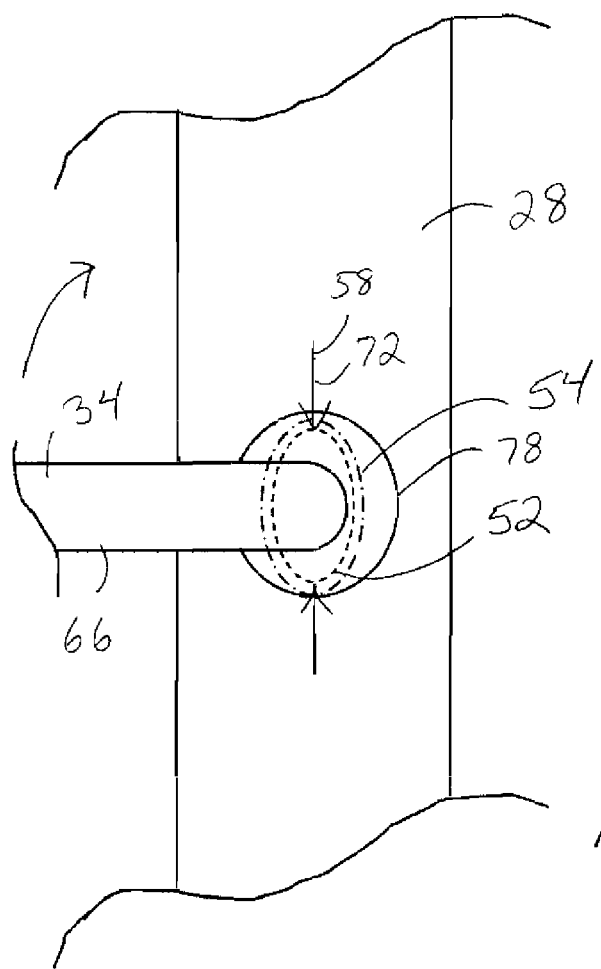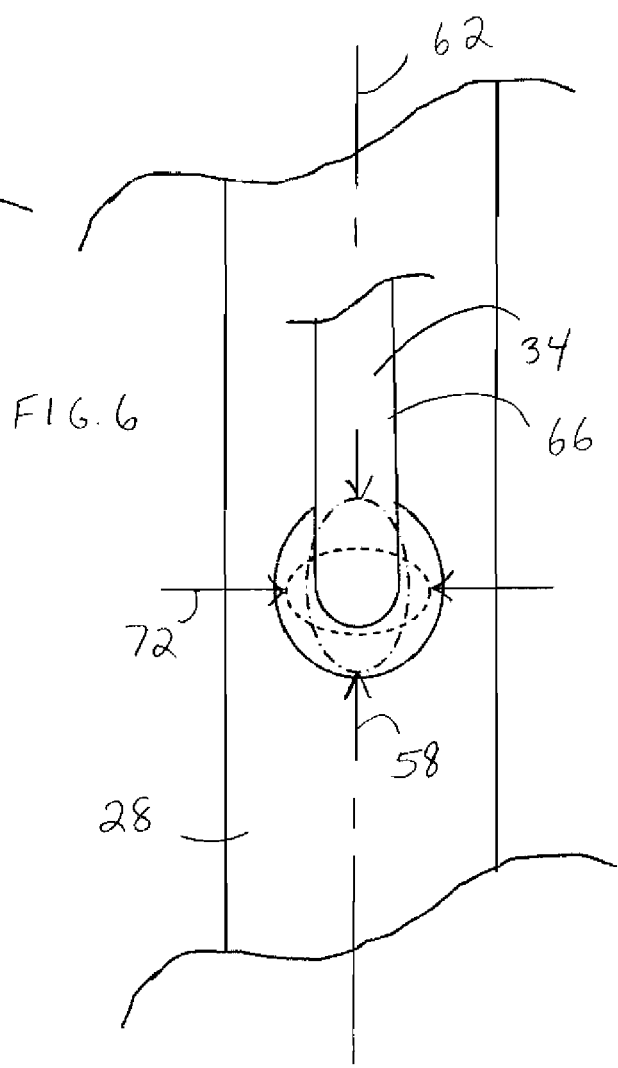

US 7,959,189 B2

TUBE INTERFACE AND METHOD OF SECURING A FIRST TUBE TO A SECOND TUBE

RELATED INVENTION

The present patent is a divisional of "Tube Interface And Method Of Securing A First Tube To A Second Tube", Ser. No. 11/040,771, filed on 20 Jan. 2005, now U.S. Pat. No. 7,380,327, issued on 3 Jun. 2008, which is incorporated by reference herein.

TECHNICAL FIELD OF THE INVENTION

The present invention relates to the field of tube connections. More specifically, the present invention relates to a tube interface between a first tube and a second tube.

BACKGROUND OF THE INVENTION

A vast number of assemblies include interconnecting tubes, and many of these interconnecting tubes are those in which a second tube interconnects with an outer wall of a first tube and extends transverse to a first tube.

One exemplary assembly that can include interconnecting tubes is a heat exchanger. A heat exchanger is a device which transfers the heat of one substance to another (i.e., from a warm or hot surface to a cold or cooler one) such as evaporators, condensers, and radiators. A conventional vapor compression system typically includes two heat exchangers, an evaporator and a condenser. Some vapor compression systems further include a receiver dryer which is intended to perform some or all of the following functions: filtration and/or dehydration of refrigerant, compensation for variations in its volume, and separation of the vapor and liquid phases of the refrigerant. Typically, a fluid inlet tube (i.e., a second tube) extends from an outer wall of a condenser header (i.e., a first tube) and is coupled between an upstream section of the condenser header and an inlet port of the receiver for carrying vapor and liquid phases of refrigerant to the receiver dryer. A fluid outlet tube extends from the outer wall of the condenser header and is coupled between an outlet port of the receiver and a downstream section of the condenser header (i.e., the first tube) for returning liquid phase refrigerant to the downstream section.

Many assemblies, including condenser systems used in vehicle air conditioning systems, are typically manufactured by first assembling brazing clad components together, then passing the assembled components through a brazing furnace to braze, or fuse, the components together. In condenser systems, typically one or more brackets are used to mount the receiver dryer, inlet tube, and outlet tube to a header of the condenser. The bracket or brackets may be first bolted or tack welded to the header prior to the brazing process.

Various techniques have been employed for connecting the inlet and outlet tubes to the condenser header. For example, the inlet and outlet tubes and the receiver dryer may be bolted to the brackets and/or tack welded into place prior to brazing. As such, the inlet and outlet tubes and the receiver dryer can be fused with condenser system during brazing. Unfortunately, bolting and tack welding prior to brazing is typically performed manually, thus resulting in undesirable labor costs for the manufacturing process.

In order to avoid the problems associated with bolting and/or tack welding prior to brazing, other prior art techniques include a specially shaped opening in an element and/or a specially shaped mating end of a tube to be inserted into the element. For example, the tube end may include a transversely extending peg and the opening may include a notch for passage of the peg so that during brazing the tube can be held temporarily in the opening by the peg after the tube has been rotated in the opening. Unfortunately, such a structure calls for the incorporation of a separate, and undesirably costly, process in both the tube and header to fabricate the notch and the peg. In another scenario, the tube end is specially shaped to include a protuberance, or spout, that holds the tube temporarily in the opening prior to being soldered together. Such a structure calls for relatively complex manufacturing of the protuberance. In addition, due to the protuberance, the tube must be inserted at an angle greater than perpendicular to the element to which it is being coupled, making assembly more difficult and causing an undesirably loose fit between the tube and the opening.

Alternative to the above pre-braze techniques, the inlet and outlet tubes and the receiver dryer may be coupled to the brackets and to the header following the brazing process via threaded connections, connecting sleeves, or press fitting. While these prior art techniques may be generally satisfactory, such techniques call for an undesirably high number of discrete components. The undesirably high number of discrete components increases the likelihood that the system will be misassembled, increases the potential for damaging the inlet and outlet pipes coupled between the condenser and the receiver dryer, and increases the likelihood of fluid leakage. In addition, the post-braze manual assembly again results in undesirable labor costs for the manufacturing process.

Thus, what is needed is a technique that enables simple, secure, cost effective, and convenient fixation of a first tube to a second tube, and more specifically, the fixation of the inlet and outlet tubes to a condenser header.

SUMMARY OF THE INVENTION

Accordingly, it is an advantage of the present invention that a tube interface and a method for securing a second tube to a first tube are provided.

Another advantage of the present invention is that a tube interface and method are provided that enable rapid and simple securing of the second tube to the first tube prior to brazing.

Yet another advantage of the present invention is that a tube interface and a method are provided that facilitate connection of the inlet and outlet tubes of a receiver with a header of a condenser.

The above and other advantages of the present invention are carried out in one form by a method of securing a second tube to a first tube. The method calls for creating an oblong opening in a wall of the first tube, the oblong opening exhibiting a first major dimension, and shaping the second tube to have an oblong end exhibiting a second major dimension. The oblong end of the second tube is inserted into the oblong opening in the first tube such that the second major dimension is aligned with the first major dimension. The second tube is then turned in the oblong opening to move the second major dimension of the oblong end out of alignment with the first major dimension of the oblong opening to secure the second tube to the first tube.

The above and other advantages of the present invention are carried out in another form by a tube interface that includes a first tube having an oblong opening in a wall of the first tube, the oblong opening exhibiting a first major dimension. The tube interface further includes a second tube having an oblong end inserted into and secured in the oblong opening. The oblong end exhibits a second major dimension oriented out of alignment with the first major dimension.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a perspective view of a fluid tube of the condenser system of FIG. 1 in accordance with a preferred embodiment of the present invention;

FIG. 4 shows a bottom view of the fluid tube of FIG. 3;

FIG. 5 shows a partial front view of the header to which the fluid tube is being coupled;

FIG. 6 shows a partial front view of the header onto which the fluid tube is coupled; and FIG. 7 shows a side view of a tube interface between the fluid tube and header of the condenser system.

DETAILED DESCRIPTION OF THE PREFERRED EMBODIMENTS

The present invention entails a tube interface and a method for securing a second tube to a first tube. The tube interface of the present invention is generally a place at which two elements (the second tube and the first tube) meet and communicate with each other. In keeping with an exemplary scenario discussed below, the tube interface provides a secure, albeit temporary, connection of a fluid carrying tube (i.e., the second tube) to a wall of a header (i.e., the first tube) in a heat exchanger in preparation for a furnace brazing process that subsequently fuses the components together. The present invention will be described in connection with a condenser system. However, it will become apparent that the present invention may be implemented in a number of systems in which the goal is to secure a first tube to the wall of a second tube with or without a subsequent brazing process. In the exemplary embodiment described below, the first and second tubes have a generally circular cross-sectional configuration. However, it should be understood that the first and second tubes may alternatively exhibit any of a number of cross-sectional configurations.

Figure 1:
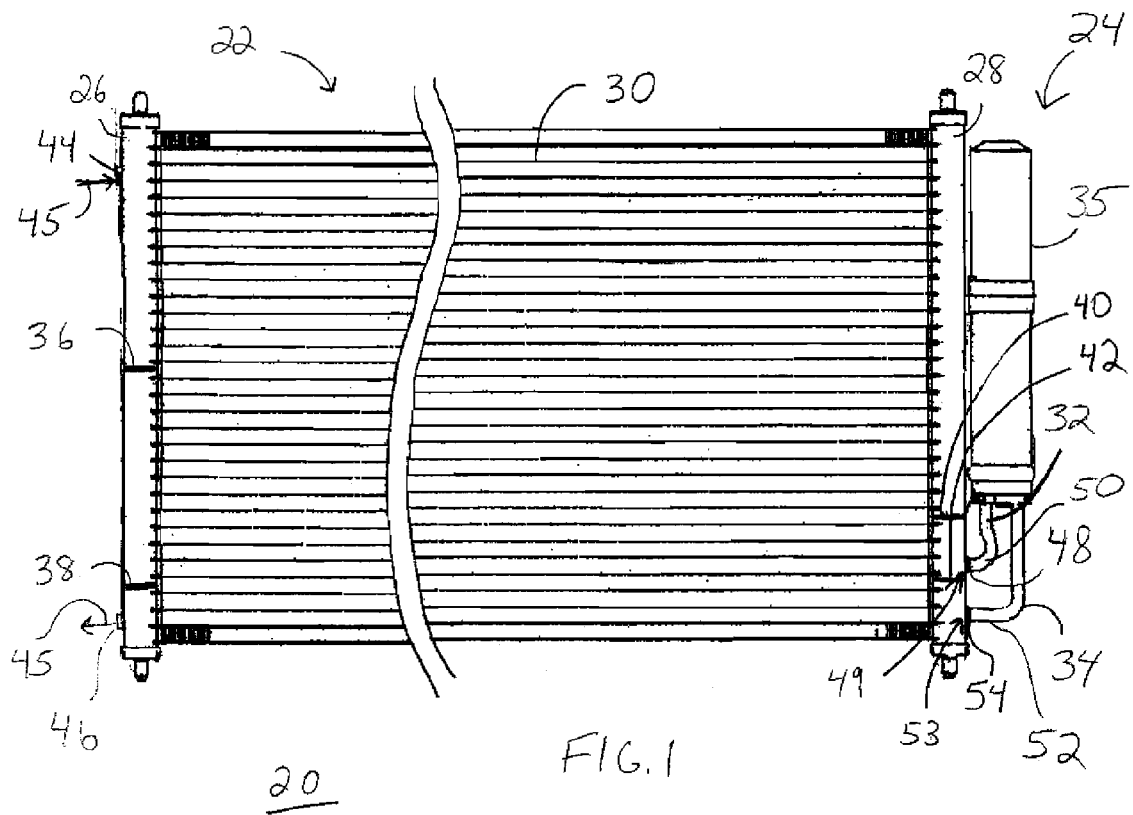
FIG. 1 shows a side view of a condenser system for a vapor compression system.

FIG. 1 shows a side view of a condenser system 20 for a vapor compression system (not shown). In an exemplary embodiment, the vapor compression system may be a vehicle air conditioning system, known to those skilled in the art, for cooling the passenger compartment of a vehicle. Condenser system 20 includes a condenser, generally designated 22, and a receiver portion, generally designated 24. Condenser 20 includes a pair of tubular, parallel headers, generally designated as a first header 26 and a second header 28. Parallel tubes 30 extend between first and second headers 26 and 28, respectively, for passing refrigerant between first and second headers 26 and 28. Receiver portion 24 includes an inlet tube 32, an outlet tube 34, and a receiver dryer 35.

In an exemplary embodiment, condenser 22 is a multiple pass condenser. As such, first header 26 includes imperforate walls 36 and 38 extending through first header 26. Similarly, second header 28 includes imperforate walls 40 and 42 extending through second header 28. First header 26 includes an inlet 44 for receiving a mixture of vapor and liquid phase refrigerant 45 from a compressor (not shown) of the vehicle air conditioning system (not shown). Below imperforate wall 38, first header 26 includes an outlet 46 for directing liquid phase refrigerant 45 from condenser 22 toward the evaporator (not shown) of the vehicle air conditioning system.

Between imperforate walls 40 and 42, second header 28 includes an outlet opening 48 to which a header attachment end 50 of inlet tube 30 couples at a first tube interface 49. An opposite end of inlet tube 30 couples to receiver dryer 35. An end of outlet tube 34 couples to receiver dryer 35, and a header attachment end 52 of outlet tube 34 couples at a second tube interface 53 to an inlet opening 54 of second header 28 below imperforate wall 42.

In general, vapor and liquid phase refrigerant 45 enters condenser system 20 at inlet 44 of first header 26. Refrigerant 45 may be distributed by first header 26 to tubes 30 that are above imperforate wall 36 to flow to second header 28. Once refrigerant 45 enters second header 28, it is distributed to tubes 30 that are above imperforate wall 40, but below imperforate wall 36, to flow back to first header 26. At first header 26, vapor and liquid phase refrigerant 45 is distributed to tubes 30 that are above imperforate wall 38, but below imperforate wall 40 of second header 28. At second header 28, refrigerant 45 is then routed to receiver dryer 35 via inlet tube 32.

As known to those skilled in the art, receiver dryer 35 may include a desiccant (not shown). The desiccant tends to absorb any water that is mixed with the refrigerant. Receiver dryer 35 further serves to separate the liquid phase refrigerant from the vapor phase refrigerant. After the liquid phase refrigerant and the vapor phase refrigerant are separated within receiver dryer 35, liquid refrigerant 45 enters second header 28 below imperforate wall 42 via outlet tube 34, where it is subsequently routed to tubes 30 below imperforate wall 38 of first header 26.

This last path of travel through condenser 22 is known as a sub-cooler section of condenser system 20. The sub-cooler section sub-cools the liquid refrigerant 45 to a point below the temperature at which the liquid changes to a gas. Following sub-cooling, liquid refrigerant 45 passes to first header 26 below imperforate wall 38 and exits from outlet 46 for eventual receipt at the evaporator (not shown) of the vehicle air conditioning system (not shown).

Condenser system 20 is described as being a multiple pass condenser having an integral sub-cooling section. However, the invention does not require that the condenser system be a multiple pass condenser. Rather, the number of passes will vary as dictated by the requirements of a particular system. Nor does the invention require that the condenser system be used solely in vehicle air conditioning systems. Rather, the present invention may be implemented in a variety of systems in which an interface is to be created between a pair of tubes.

Figure 2:
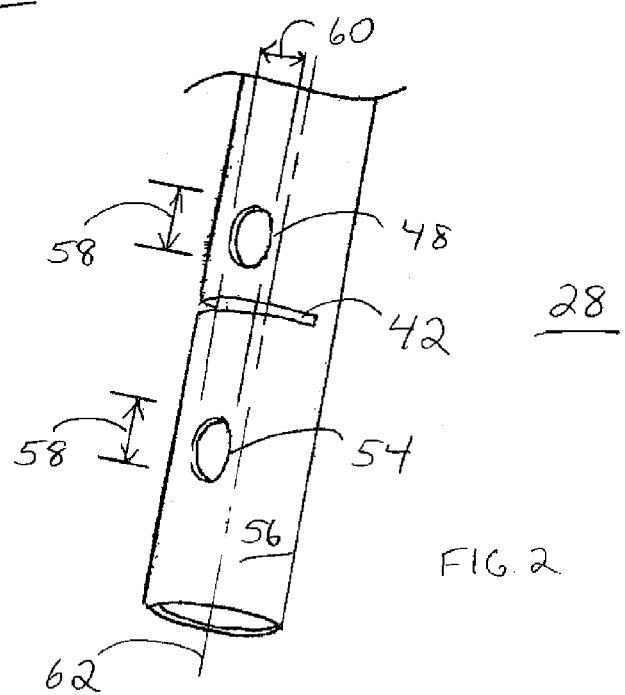
FIG. 2 shows a partial perspective view of a header of the condenser system of FIG. 1 revealing an outlet opening and an inlet opening.

FIG. 2 shows a partial perspective view of second header 28 of condenser system 20 revealing outlet opening 48 and inlet opening 54 that form a portion of first and second tube interfaces 49 and 53, respectively (FIG. 1). Each of outlet opening 48 and inlet opening 54 are created in a wall 56 of second header 26, and each exhibit an oblong cross-sectional shape. In accordance with a preferred embodiment of the present invention, the oblong shape is elliptical for cost effectiveness and simplicity of manufacture. However, it should be understood that other cross-sectional shapes that deviate from a circle or square due to elongation may be alternatively utilized, such as, an oval or a rectangle. When interconnecting a receiver dryer with a condenser, openings are typically formed in the condenser to allow interconnection with inlet and outlet tubes. Consequently, the creation of oblong-shaped inlet and outlet openings 48 and 54, as opposed to prior art circular openings, does not negatively impact manufacturing costs.

Each of outlet and inlet openings 48 and 54, respectively, exhibits a first major dimension 58. First major dimension 58 is a length of a line, i.e., the major axis, which passes through the foci of the oblong outlet and inlet openings 48 and 54, respectively. In addition, each of outlet and inlet openings 48 and 54 exhibit a first minor dimension 60. First minor dimension 60 is a length of a line, i.e., the minor axis, which passes through the center of and at right angles to the major axis.

In a preferred embodiment, each of outlet and inlet openings 48 and 54, respectively, is oriented such that first major dimension 58 is approximately parallel to a longitudinal axis 62 of second header 28. First major dimension 58 of outlet opening 48 need not be equal to first major dimension 58 of outlet opening 48. Similarly, first minor dimension 60 of outlet opening 48 need not be equal to first minor dimension 60 of inlet opening 54. Rather, one skilled in the art may determine the actual lengths in response to desired flow parameters of refrigerant 45 (FIG. 1) entering and exiting receiver dryer 35 (FIG. 1).

Referring to FIGS. 3-4, FIG. 3 shows a perspective view of outlet tube 34 of condenser system 20 (FIG. 1) in accordance with a preferred embodiment of the present invention. FIG. 4 shows a bottom view of outlet tube 34. The present invention is discussed in connection with outlet tube 34 for simplicity of illustration. However, it should be understood that the following discussion applies equally to inlet tube 32.

Outlet tube 34 includes a first section 64 and a second section 66 arranged approximately perpendicular to first section 64. Header attachment end 52 is formed as an oblong end in first section 64. More specifically, header attachment end 52 may be shaped by deforming, or stretching, header attachment end 52 of first section 64 to exhibit an elliptical shape corresponding to the elliptical shape of inlet opening 54 (FIG. 2) of second header 28 (FIG. 2). As more clearly illustrated in FIG. 4, this deformation of header attachment end 52 may result in a length 70 having a flared, or tapered, profile. For clarity of description, header attachment end 52 is referred to hereinafter as oblong end 52.

Oblong end 52 exhibits a second major dimension 72 and a second minor dimension 74. In a preferred embodiment, second minor dimension 74 is oriented approximately parallel to a second longitudinal axis 76 of second section 66. The shaping of oblong end 52 entails defining second major dimension 72 to be slightly less than first major dimension 58 (FIG. 2), and defining second minor dimension 74 to be slightly less than first minor dimension 60 (FIG. 2). For example, second major dimension 72 and second minor dimension 74 may be approximately 1-5% shorter than the corresponding first major dimension 58 and first minor dimension 60. In addition, second major dimension 72 of oblong end 52 is defined to be greater than first minor dimension 60 of inlet opening 54 (FIG. 2) in second header 28 (FIG. 2), as will be discussed in greater detail below.

A shoulder 78, or bead, is formed about a perimeter of first section 64 of outlet tube 34 proximate oblong end 52. Shoulder 78 serves as a stop that checks the movement of oblong end 52 of outlet tube 34 into inlet opening 54 (FIG. 2) of second header 28 (FIG. 2), as will be discussed in greater detail below.

Referring to FIGS. 5-7, FIG. 5 shows a partial front view of second header 28 to which outlet tube 34 is being coupled. FIG. 6 shows a partial front view of second header 28 onto which outlet tube 34 is coupled, and FIG. 7 shows a side view of second tube interface 53 between outlet tube 34 and second header 28 of condenser system 20 (FIG. 1). FIGS. 5-7 illustrate an assembly activity that secures outlet tube 34 to second header 28. Again, it should be understood that the following discussion applies equally to inlet tube 32. That is, the following assembly activity additionally secures inlet tube 32 to second header 28. The assembly activity desirably takes place prior to a furnace brazing process during which inlet tube 32 and outlet tube 34 are fused with second header 28.

As shown in FIG. 5, oblong end 52 (shown in ghost form) of outlet tube 34 is inserted into the oblong opening, i.e., inlet opening 54 (shown in ghost form), in wall 56 of second header 28. In particular, second major dimension 72 of outlet tube 34 is aligned with first major dimension 58 of second header 28. As such, second section 66 of outlet tube 34 is transverse to second header 28. The cooperative size and shape of oblong end 52 relative to inlet opening 54 enables the simple insertion of oblong end 52 without the need to tilt or otherwise maneuver oblong end 52 into inlet opening 54.

Oblong end 52 is moved into inlet opening 54 until shoulder 78 abuts wall 56 of second header 28, as shown in FIG. 7. Following insertion, outlet tube 34 is turned, or rotated, in inlet opening 54 to move second major dimension 72 out of alignment with first major dimension 58.

As shown in FIG. 6, the movement causes second major dimension 72 to be transverse to first major dimension 58 which further causes second section 66 of outlet tube 34 to align with longitudinal axis 62 of second header 28. The rotation of outlet tube 34 relative to second header 28 and the cooperative sizing of oblong end 52 with inlet opening 54 cause oblong end 52 to become secured in second header 28, thus forming second tube interface 53.

This secured fitting can be an interference fit in which oblong end 52 and inlet opening 54 are purposely forced, or wedged, together. Alternatively, this secured fitting can be a relatively loose clearance fit where there is space between oblong end 52 and inlet opening 54, or the secured fitting can be a transition fit where interference may or may not occur. The amount of interference or clearance is achieved by specifying the tolerance range for the possible sizes of oblong end 52 and inlet opening 54.

After inlet and outlet tubes 32 and 34, respectively, are secured in their corresponding outlet and inlet openings 48 and 54, respectively, and following the pre-braze assembly of condenser system 20 (FIG. 1), condenser system 20 can be passed through a brazing furnace to fuse the components together.

In summary, the present invention teaches of a tube interface and a method for securing a second tube to a first tube. In particular, the first tube has an oblong opening and the second tube has an oblong end that is inserted into the oblong opening. The second tube is subsequently turned to secure the second tube to the first tube to form the tube interface. The methodology and tube interface enable rapid and simple securing of the second tube to the first tube prior to brazing without the need for additional components, fixtures, and/or post-braze assembly. In addition, the tube interface and methodology particularly facilitate connection of the inlet and outlet tubes of a receiver with the header of a condenser system.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A tube interface comprising:
a first tube having an oblong opening in a wall of said first tube, said oblong opening exhibiting a first major dimension and a first minor dimension; and
a second tube having an oblong end, said oblong end exhibiting a second major dimension and a second minor dimension, said second major dimension being less than said first major dimension, and said second minor dimension being less than said first minor dimension, said second tube including a shoulder about a perimeter of said second tube proximate said oblong end, said tube interface being formed by aligning said second major dimension of said second tube with said first major dimension of said first tube, inserting said oblong end into said oblong opening in said first tube, and turning said second tube in said oblong opening to move said second major dimension of said oblong end out of alignment with said first major dimension of said oblong opening to secure said second tube to said first tube, said shoulder abutting an outer wall of said first tube.

2. A tube interface as claimed in claim 1 wherein said first major dimension of said oblong opening is aligned with said longitudinal axis of said first tube.

3. A tube interface as claimed in claim 1 wherein said second major dimension of said oblong end is greater than said first minor dimension of said oblong opening.

4. A tube interface as claimed in claim 1 wherein:
said oblong opening exhibits an elliptical shape; and
said oblong end exhibits a corresponding elliptical shape.

5. A tube interface as claimed in claim 1 wherein said first tube is a header of a heat exchanger and said second tube is a fluid carrying tube.

6. A tube interface comprising:
a first tube having an oblong opening in a wall of said first tube, said oblong opening exhibiting a first major dimension; and
a second tube having an oblong end inserted into and secured in said oblong opening of said first tube, said oblong end exhibiting a second major dimension oriented out of alignment with said first major dimension, and said second tube comprises a shoulder about a perimeter of said second tube, said shoulder abutting an outer wall of said first tube.

7. A tube interface as claimed in claim 6 wherein said second major dimension is less than said first major dimension.

8. A tube interface as claimed in claim 6 wherein said second major dimension is greater than a first minor dimension of said oblong opening.

9. A tube interface comprising:
a header of a heat exchanger, said header having an oblong opening in a wall of said header, said oblong opening exhibiting a first major dimension; and
a fluid carrying tube having an oblong end inserted into and secured in said oblong opening of said header, said oblong end exhibiting a second major dimension oriented out of alignment with said first major dimension.

* * * * *